United States Patent [19]

Blum et al.

[11] Patent Number: 5,517,259
[45] Date of Patent: May 14, 1996

[54] METHOD OF MANUFACTURING TORIC SINGLE VISION, SPHERICAL OR ASPHERIC BIFOCAL, MULTIFOCAL OR PROGRESSIVE CONTACT LENSES

[75] Inventors: Ronald D. Blum, Roanoke, Va.; Amitava Gupta, Bethesda, Md.

[73] Assignee: Innotech, Inc., Roanoke, Va.

[21] Appl. No.: 225,386

[22] Filed: Apr. 8, 1994

Related U.S. Application Data

[63] Continuation-in-part of Ser. No. 216,381, Mar. 23, 1994, which is a continuation-in-part of Ser. No. 980,053, Nov. 23, 1992, Pat. No. 5,406,341.

[51] Int. Cl.⁶ ...................................................... G02C 7/04
[52] U.S. Cl. ...................... 351/160 R; 351/161; 351/177
[58] Field of Search ................................ 351/159, 160 R, 351/160 H, 161, 162, 173, 177; 425/808

[56] References Cited

U.S. PATENT DOCUMENTS

| | | | |
|---|---|---|---|
| 5,129,718 | 7/1992 | Futhey et al. | 351/161 |
| 5,142,411 | 8/1992 | Fiala | 359/494 |
| 5,170,192 | 12/1992 | Pettigrew et al. | 351/161 |
| 5,191,366 | 3/1993 | Kashiwagi | 351/177 |
| 5,391,589 | 2/1995 | Kiguchi et al. | 351/177 |
| 5,404,183 | 4/1995 | Seidner | 351/177 |

OTHER PUBLICATIONS

Contacto, Jan. 1976; pp. 31–35; Kandall, C.A.: Ultrafocal® Bifocal Contact Lens.

*Primary Examiner*—David C. Nelms
*Assistant Examiner*—F. Niranjan
*Attorney, Agent, or Firm*—Kenyon & Kenyon

[57] ABSTRACT

Methods for providing a contact lens are described. According to a first embodiment, a patient is fitted with an optical preform and the position on the surface of the optical preform corresponding to the center location of the patients's pupil is identified. Then, the optical preform, a volume of polymerizable resin, and a mold comprising a casting zone are arranged, so that the resin occupies at least the intervening space between the mold and the optical preform in the area of the casting zone and so that the casting zone on the mold is aligned to a predetermined position with respect to the position on the surface of the optical preform corresponding to the center of the patient's pupil. Finally, the resin is polymerized to provide a contact lens with an optical modification corresponding to the casting zone. According to another embodiment, a mold having a weight or stabilization zone is selected to provide a resin mass on an optical preform (which can be, for example, toric, bifocal or multifocal, and so forth) sufficient to stabilize the optical preform. The resin mass is provided in a position based, for example, on the axis of cylinder of the finished lens, the orientation of the bifocal/multifocal region on the finished lens, and so on.

24 Claims, 6 Drawing Sheets

METHOD OF MANUFACTURING TORIC SINGLE VISION, SPHERICAL OR ASPHERIC BIFOCAL, MULTIFOCAL OR PROGRESSIVE CONTACT LENSES

This Application is a continuation-in-part of application Ser. No. 216,381 filed Mar. 23, 1994, which is a continuation-in-part of application Ser. No. 980,053 filed on Nov. 23, 1992, U.S. Pat. No. 5,406,341.

BACKGROUND OF THE INVENTION

The present invention relates generally to methods for manufacturing contact lenses, and more particularly to methods for manufacturing finished aspheric single vision contact lenses, or finished spherical or aspheric bifocal, multifocal or progressive addition contact lens.

Contact lenses are generally manufactured by a machining or casting process. The machining process begins with a plastic disk or a blank, which is blocked on an arbor with a suitable wax, then mounted into a collet of a multi-axis lathe turning machine. After machining the first surface, the part is transfer blocked to a second side arbor and the second surface machined as before. Such a simple lathe turning process can only provide centrosymmetric optic geometries. Contact lenses embodying non-centrosymmetric geometries can only be manufactured by a casting process using a mold having an appropriate surface geometry. Thirty years of studying the casting process has led to the development of several efficient and rapid molding processes for contact lenses that incorporate complex optical geometries, such as toric contact lenses, bifocal aspheric contact lenses and so on.

While contact lenses are worn by over 10% of all antimetropes in the U.S., bifocal or multifocal contact lenses have enjoyed only a mixed success. No bifocal or multifocal contact lens has been successfully accepted by more than 70% of the patients fitted with a particular design. It is believed that a contact lens fits over the cornea of an individual in a unique manner, so that the spacial relationship between the optical center of the lens and the cornea is not entirely predictable. In other words, the lens undergoes microscopic movement after being fitted on a patient, until it achieves the more stable position over the cornea. This movement is too small to cause any significant change in the refractive correction provided by the lens, if the lens is of single vision type; however, for certain bifocal contact lenses to work properly, the add power zone must always line up within the pupillary aperture, therefore, even this microscopic repositioning over the cornea may shift the add power zone out of the pupillary aperture and create refractive problems for the patient.

The reason why the add power zone must be centered with respect to the pupil and occlude a certain optimum fraction of the pupillary aperture is that for a multifocal lens to function properly, the retina should receive all the images at the same time. For distant objects, the image formed by the base power zone is focused, while the image formed by the add power zone is not focused. For near objects, the image formed by the base power zone is defocused, while the image formed by the add power zone is focused. Given one focused and one or more defocused images, the image processing apparatus at the retina and the visual cortex rejects the unfocused images and processes the focused image.

Persons with normal accommodation not requiring any refractive correction also receive multiple images simultaneously at their retina, and possess the ability to ignore the defocused image of far objects when looking at near objects, and vise versa. This analogy to a normal eye indicates that for a bifocal or multifocal contact lens to work properly, the add power zone must be entirely within the pupillary aperture. Since image strength at the retina is proportional to the area of the corresponding refractive zone (i.e., add or base power) subtended at the pupil, the optimum area of the add power zone can be computed with respect to the pupil size. It is known that pupil size varies from person to person and also depends on the level of ambient illumination and physicochemical status of the individual. For example, the pupil size of a thirty year old can vary from 2.2 mm in direct sunlight to 5.7 mm outdoors at night. Data on pupil size distributions by age and illumination level are available in the literature. The assumption may also be made that the contact lens wearer will generally be outdoors when experiencing extreme levels of illumination, where distance vision will be needed the most, whereas ambient illumination is at an intermediate level indoors, where near and intermediate vision is required most often. Based on these considerations, it is possible to develop a model which predicts the optimum sizes of the add power zone for near vision/base power zone for distance vision and aspheric zones for intermediate vision, if needed. Such a model is disclosed in U.S. Pat. No. 5,112,351.

In some circumstances, it is also useful to properly position the toric surface of a contact lens with respect to the pupil of an astigmatic user. A more significant problem associated with toric or aspheric lenses is the sheer number of lenses that must be kept in stock for adequate customer selection. For example, to stock all of the possible combinations for lenses over a spherical range of −15.00 D to +15.00 D in 0.25 D steps (121 spherical powers), over a cylinder range of 0.00 D to −5.00 D in 0.25 D steps (21 powers), and an astigmatic rotation range of 180° in 2° steps (90 rotations) would require that 228,690 lenses be stocked. Even if the stigmatic range is broken down into 15° steps (12 rotators), as is commonly done in lens manufacturing, 30492 lenses would have to be stocked. Ideally, the practitioner would only stock a set of lenses having the required sphere and cylinder, while later correcting for rotation (2541 lenses), or stock a set of spherical lens, while later adding a toric surface for cylinder and adjusting for rotation (121 lenses), or stock a set of toric lenses while later correcting for sphere or rotation (21 lens), or stock a set of preforms having a single power, while later correcting for sphere, cylinder and rotation.

In view of the above, there is a need for a contact lens where the add power zone or toric zone is precisely positioned with respect to the pupil of the wearer, and for a process for making the same. At the same time, there is also a need for lenses that can be easily modified in-house to provide proper sphere, cylinder and rotation as needed.

SUMMARY OF THE INVENTION

The present invention provides a method for manufacturing a finished contact lens in which an optical preform selected for comfortable fit and optimal distance vision is first placed on the patient and allowed to stabilize on the cornea. Once on the eye, the position of the center of the pupil with respect to the optical preform is noted and the appropriate optical modification is then added. The modification may be a spherical curvature, an aspheric curvature, or a combination of spherical and aspheric curvatures. Such optical modifications may be centrosymmetric (i.e., centered with respect to the pupil) or they may be asymmetric with respect to the pupillary center. Furthermore, they can be located outside, inside, or both inside and outside of the pupillary zone, and they can be located on the convex or concave face of the optical preform.

In some instances, the rotation of the lens may not stabilize on the cornea to a suitable degree. Lens rotation is undesirable in a number of circumstances, including toric lenses and non-centrosymmetric multifocal lenses. Thus, it is often desirable to stabilize the contact lens, either prior to placing the lens on the patient or after rotation is observed on the cornea of the patent. A preferred method of providing rotation stabilization is by means of a resin mass, or resin weight, that is cast on the surface of an optical preform. Another preferred embodiment for stabilization is matching closely the topography or shape of the cornea with the concave curvature or concave topography of the contact lens. Observation of rotation on the patient's cornea can be enhanced by means of a mark or marks that is optionally used to designate the center of the patient's pupil and/or the axis of the astigmatic correction by being placed at the inferior 270° lower periphery of the contact lens.

The present invention also relates to a method of casting contact lenses that operates in accordance with the above modifications (additions of bifocal, multifocal and progressive zones, additions of toric zones, setting the axis of either a toric single vision or toric bifocal contact lens, and additions of a weight or counterbalance on the surface of the preform) as well as the modification of the distance correction of the lens. This method employs a process called SurfaceCasting™, which allows the casting of a weighted resin mass or a spherical or aspheric optical surface over all or a portion of a contact lens optical preform. The added new surface can be feathered (or dissipated) in the periphery so as to provide a smooth comfortable new surface or, in the case where the new surface extends to the edge of the optical preform, it can be polished or blended. The lens preform may be uncorrected or spherical and/or aspheric and may be mono- or multi-focal. Details of this casting process for eyeglasses lenses are disclosed in U.S. Pat. No. 5,219,497, the disclosure of which is hereby incorporated by reference.

Various other advantages of the methods of the present invention and lenses made thereby will be evident from the detailed description of certain embodiments below.

DETAILED DESCRIPTION OF THE INVENTION

According to an embodiment of the present invention, the patient is first fitted with an optical preform. The curvature of the preform is selected so that the patient is comfortable. The preform is preferably fabricated from a hydrophilic polymer, preferably with a high water content, or a rigid, hydrophobic, gas permeable material, with a high oxygen permeability (Dk/l>45).

If a bifocal, multifocal or progressive zone is to be added, then the optical preform can be selected to have no correction, distance correction, astigmatic correction, both distance and astigmatic correction, and so forth. If a toric zone is to be added, then the optical preform can be selected to have no correction, distance correction, bifocal, multifocal or progressive correction, both distance and bifocal, multifocal or progressive correction, and so forth. If both astigmatic and bifocal, multifocal or progressive correction are to be added, then the optical preform can be selected to have no correction, distance correction and so forth.

When appropriate, any of the above modified optical performs can be stabilized. For example, as noted above, the fitted lens may not stabilize on the cornea of the patient to a suitable degree. In such cases, it may be desirable to stabilize the contact lens, either prior to placing the lens on the patient or after rotation is observed on the cornea of the patent. Observation of rotation on the patient's cornea is enhanced by means of the mark that is optionally used to designate the center of the patient's pupil in the present invention (see below). Methods of stabilizing contact lenses are known in the art and include weighting, truncation, prism balancing, toric design on the front or back of the lens, and so forth. For example, a weighted zone 25 can be cast on the optical preform as shown in FIG. 4D.

The spherical power range of the optical preform spans 30 diopters in 0.25 D increments, from +15.00 D to −15.00 D. It may also incorporate cylindrical correction in the range of 0.00 D to −5.00 D, in 0.25 D increments. The optical preform is preferably provided with a mark on opposing ends of a diameter denoting the direction or the axis of the cylinder, if any is incorporated in the optical preform. Preferably, the optical preform is formed from a material that is transparent to ultraviolet radiation in the wavelength range 320–400 nm, providing at least 80% transmission.

The method of the present invention may employ a preform that consists of a cross-linked, hydrophilic network, with water uptake ranging from 37% to 75%, composed of a mixture of acrylates, methacrylates, vinyl carbazoles, at least some of which carry hydroxy or amino substitutes, e.g., hydroxyethyl methacrylate, or N- or C-methyl vinyl carbazole, N,N-dimethylamino ethyl methacrylate, as well as hydrophobic acrylates, methacrylate or vinyl compounds, such as methyl methacrylate, ethyl methacrylate, propyl methacrylate, ethyl acrylate, butyl acrylate, styrene, substituted styrenes and, without limitation, other monomers commonly used in contact lens manufacturing. Another type of preform that may be employed is a preform formed from a rigid gas permeable material such as a cross-linkers siloxane. The network incorporates appropriate cross-linkers such as N,N-dimethyl bisacrylamide, ethylene glycol diacrylate, trihydroxy propane triacrylate, pentaerythritol tetraacrylate and other similar poly-functional acrylates or methacrylates, or vinyl compounds, such as N-methylamino divinyl carbazole. The initiator may be a thermally activated free radical polymerization initiator, such as azoisobutyronitrile, benzoyl peroxide, other peroxides, percarbonates or peracetates, commonly used in contact lens manufacturing or photochemical initiators, such as substituted benzophenones or acetophenones commercially available as Iragacure 184 and Iragacure 650 from Ciba Geigy, Kip 100F from Sartomer or Darocure 1173 from Radcure corp.

While the use of hydrophilic polymers is recommended in view of their superior biocompatibility, the method of fabricating aspheric single vision lenses or spherical or aspherical bifocal, multifocal or progressive addition contact lenses of the present invention as described herein is fully applicable to any type of optical preform. For example, rigid, gas permeable contact lenses fabricated from acrylic terminated siloxanes or rigid PMMA contact lenses may be employed in connection with SurfaceCasting™. Moreover, the surface of the optical preform may be modified in any manner desired to enhance the bonding between the resin and the preform.

Once the fit has been established with the optical preform, the patient is preferably refracted through the lens (over-refracted) to determine what, if any, add power if needed. The position of the pupil is then observed with respect to the optical preform. According to an embodiment of the invention, the center of the pupil is marked on the anterior or convex side of the optic, and the lens is removed from the eye for SurfaceCasting™ a toric zone and/or an add power zone, setting the axis of the spherotoric bifocal contact lens and, when appropriate, a modification of the distance power. If an add power zone is to be employed, either a bifocal-style add zone (e.g., a diffraction bifocal zone, a spherical crescent or flat top configuration) or a progressive-addition-style add power zone may be selected for SurfaceCasting™ depending on the patient's desires and lifestyle. The position of the pupil with respect to the lens preform can also be taken into consideration when stabilizing the lens preform against rotation.

The molds used in connection with the SurfaceCasting™ can comprise glass molds, plastic molds and metal molds. Preferred glass molds are made from annealed glass that is capable of transmitting ultraviolet radiation in the wavelength range of 350–420 nm, with a minimum transmission of 80%. Preferred plastic mold materials are polyolefins that also transmit ultraviolet radiation in the wavelength of 350–420 nm. Preferred polyolefin materials are poly[1-pentene] or poly[norbornene].

Due to the very thin nature of the contact lens optical preform, it is possible to photocure the resin by transmitting radiation through the contact lens preform. This effect can be enhanced by the use of a metal or reflective mold positioned on the resin side of the preform. However, materials that are transparent to ultraviolet radiation in the above-mentioned wavelength range are generally preferred. The molds may be either reusable, (e.g., those made of glass) or disposable (e.g., those made of polypropylene, polyolefin or some other similar polymeric material, which can be injection molded and which form dimensionally accurate forms with a high quality surface finish). Polyolefin molds are preferred for the practice of the invention due to their ability to develop a high-quality surface finish.

Figure 1:
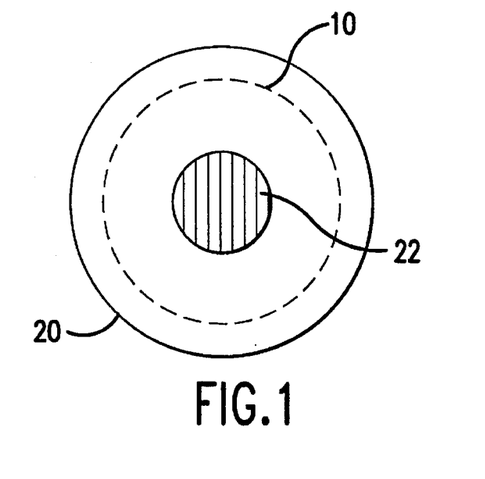
FIG. 1 schematically illustrates the placement of a bifocal contact lens over the pupillary aperture in which the add power zone is concentric with the pupillary center.
Figure 2:
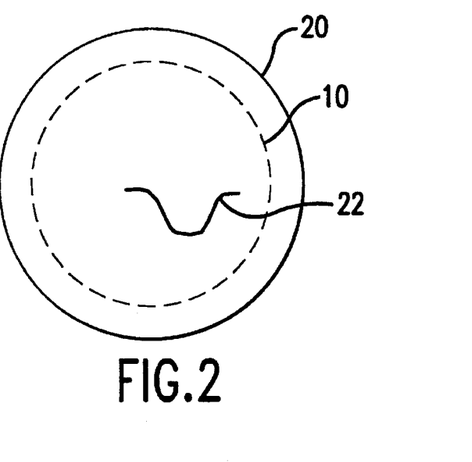
FIG. 2 schematically illustrates the placement of a progressive addition contact lens over the pupillary aperture, in which the add power zone is not concentric with the center of the pupil.
Figure 4A:
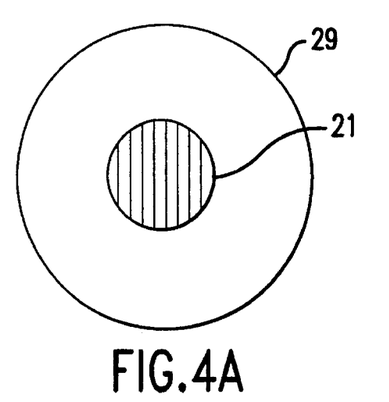
FIGS. 4A–4F schematically illustrate plan views of various contact lens designs that may be constructed according to the principles of the present invention.

Referring now to the figures, examples of an optical preform 20 having a bifocal segment 22 centered over the pupil 10 in accordance with the present invention is shown in FIGS. 1 and 4A. The add power (bifocal) zone is concentric to the pupil, is spherical in shape and occupies an area of approximately 6.3 sq. mm in this design. The corresponding mold preferably has a central bifocal zone entirely within the pupil, surrounded by a central zone (also within the pupillary aperture) having the same curvature as the anterior curvature of the optical preform, so that distance vision within the pupil may be provided. The remainder of the mold also has the same curvature as the anterior curvature of the optical preform, again ensuring that the ratio of image strengths between far and near objects is preserved for large pupils. FIGS. 2 and 4 show an optical preform 20 having a progressive bifocal segment 22 which is non-centrosymmetric with respect to the pupil 10.

Figure 3A:
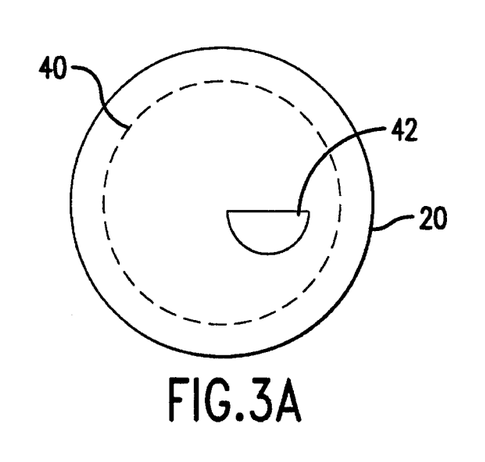
FIGS. 3A–3D schematically illustrate plan views of the optical preform and the SurfaceCasting™ mold, incorporating a bifocal add with a visible segment or a progressive add power zone.
Figure 3B:
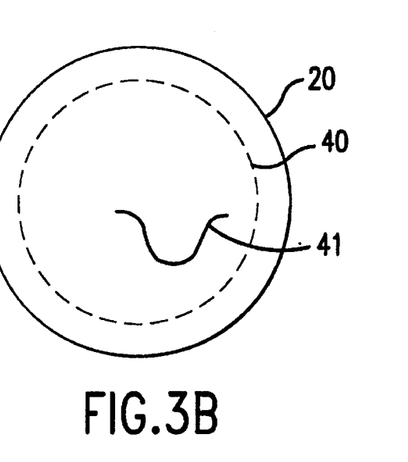
Figure 3C:
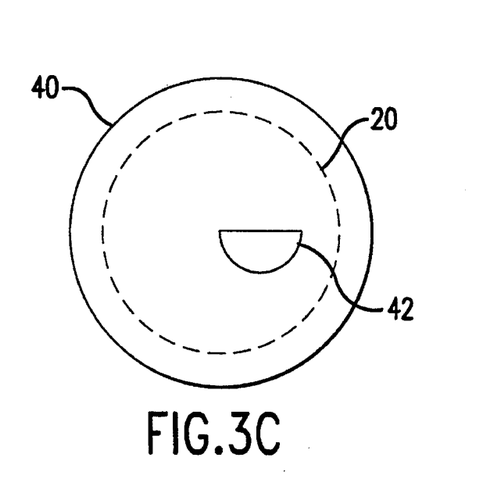
Figure 3D:
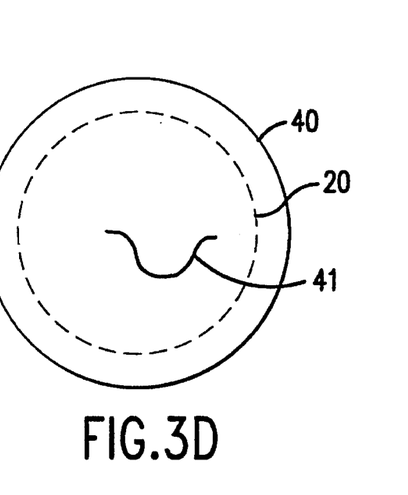

Non-centrosymmetric progressive addition molds 40 for producing such a segment are shown in FIGS. 3B and 3D. The add power zone 41 is offset from the center of the mold 40 so that a distance power zone is provided at or about the center of the mold, which in this case is positioned in a non-centrosymmetric manner. In this example, the area of the progressive addition zone 41 in the mold 40 is approximately 7.5 sq. mm, and incorporates approximately 1.2 sq. mm of area for intermediate vision.

Another mold design is shown in FIGS. 3A and 3C. In these embodiments, the add power zone 42 in the mold 40 is non-centrosymmetric with respect to the pupillary center, and consists of a spherical segment which can be of semi-circular, circular or any other shape (in this case semi-circular). Generally, the area of the add power zone occluded by the pupillary opening should not exceed 60 percent out of the total pupillary area and should be not less than 30 percent of the pupillary area.

Figure 4B:
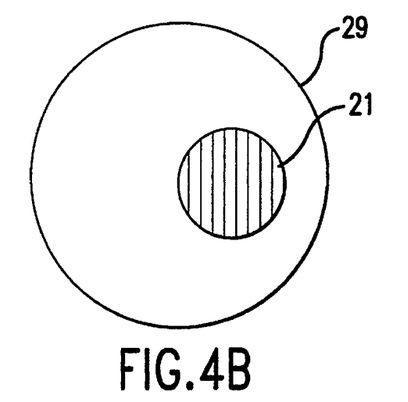
Figure 4C:
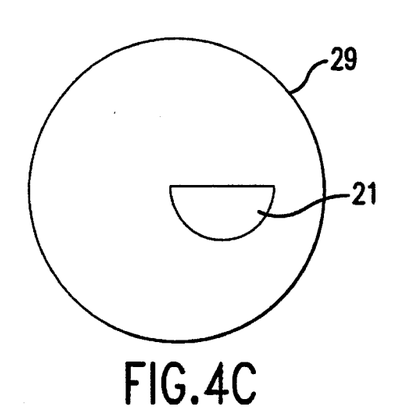
Figure 4D:
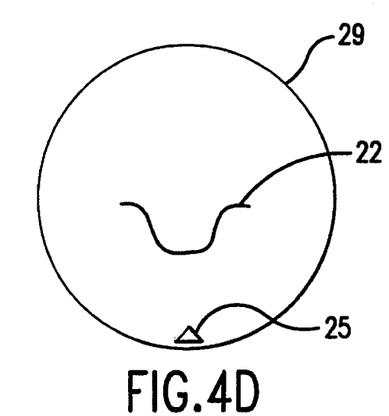
Figure 4E:
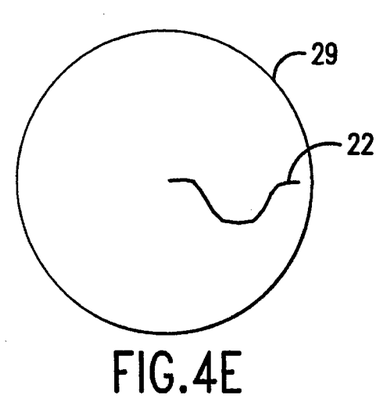
Figure 7:
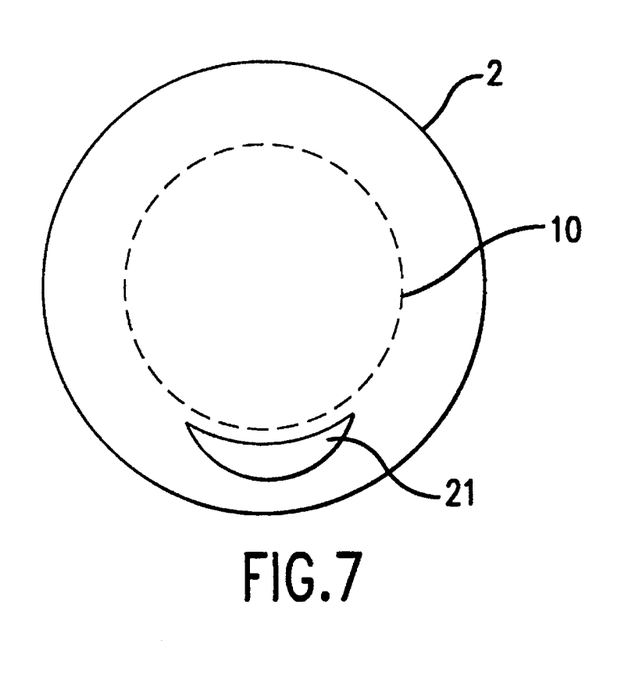
FIG. 7 is a plan view of a contact lens that incorporates a crescent bifocal zone.

Other embodiments are shown in FIG. 4B (non-centered, spherical segment 21), FIG. 4C (non-centered, flat-top segment 21), and FIG. 4D (centered, progressive-addition segment 22). In a further embodiment of the invention, which is shown in FIG. 7, the contact lens 20 incorporates a crescent bifocal zone 21 which is located below the pupillary aperture 10 and which, upon a downward gaze, translates upward to be located within the pupillary aperture 10 for near vision.

Figure 9:
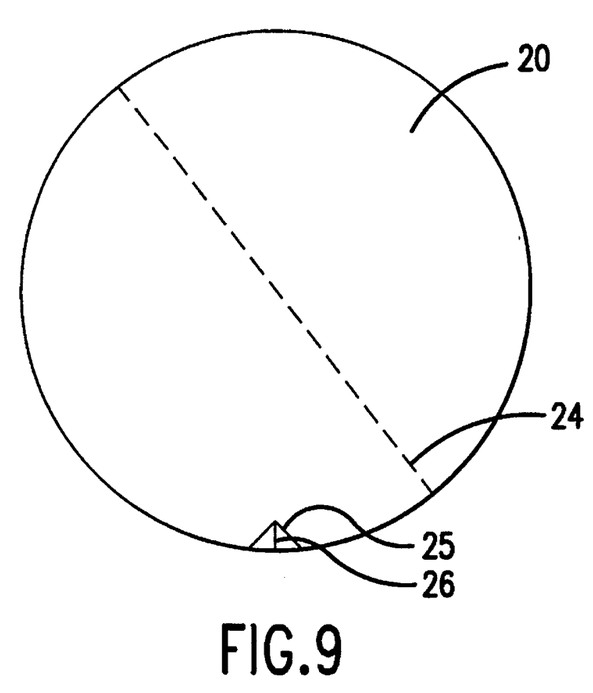
FIG. 9 is a plan view of a modified lens preform according to an embodiment of the invention, wherein the modified lens preform includes an axis of cylinder, a mark locating the position of the axis of cylinder, and a weighting position stabilizing the preform against rotation.
Figure 11:
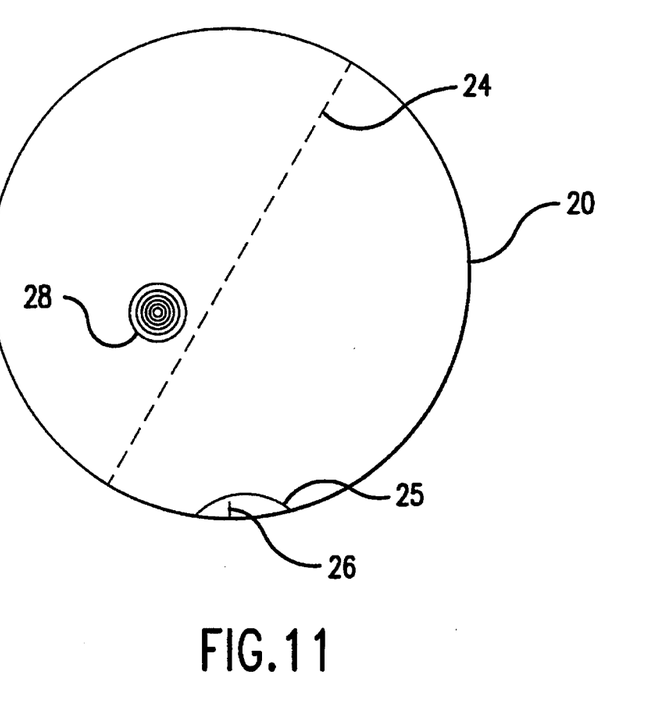
FIG. 11 illustrates a modified lens preform according to the present invention, wherein the lens preform comprises an axis of cylinder, a location mark locating the axis of cylinder, a weighted portion, and a displaced diffraction bifocal.

Still other embodiments are shown in FIGS. 9 and 11 which depict modified optical preforms 20 having an axis of cylinder 24, a location mark 26 for locating the orientation of the axis of cylinder 24 and a weighting section 25 for stabilizing the optical preform 20. FIG. 11 additionally depicts a diffraction bifocal 28 that is displaced with respect to the center of the optical preform 20.

Figure 4F:
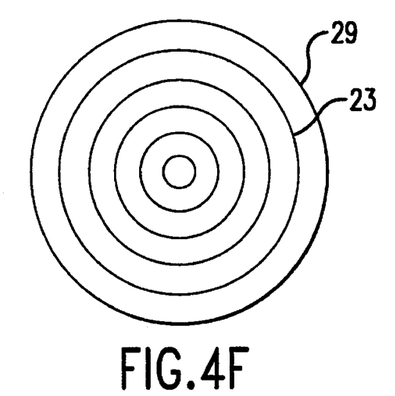
Figure 5A:
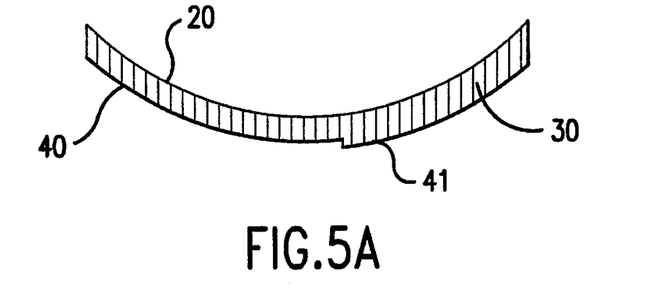
FIGS. 5A–5D illustrate cross-sectional views of resin layers in a mold assembly for the fabrication of contact lenses with add power zones (semicircular and progressive) formed between the main and optical preform for molds and preforms having substantially same and substantially different base curvatures.
Figure 5B:
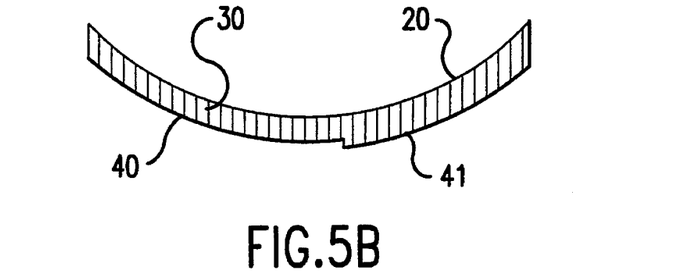
Figure 5C:
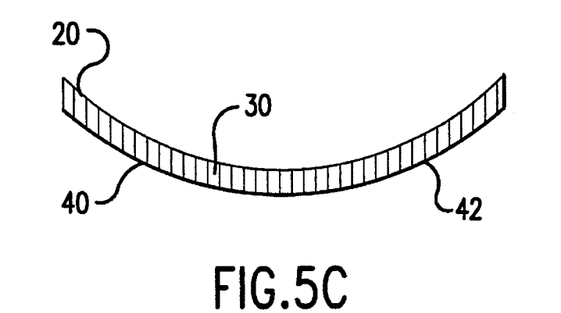
Figure 5D:
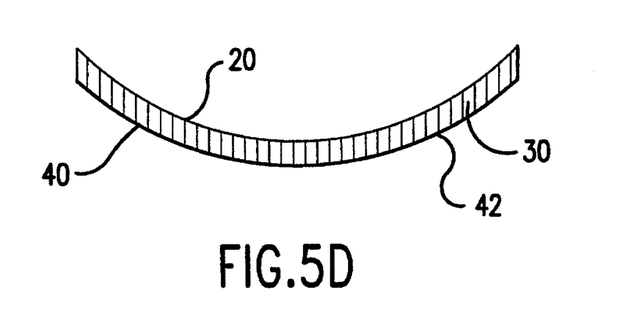
Figure 6:
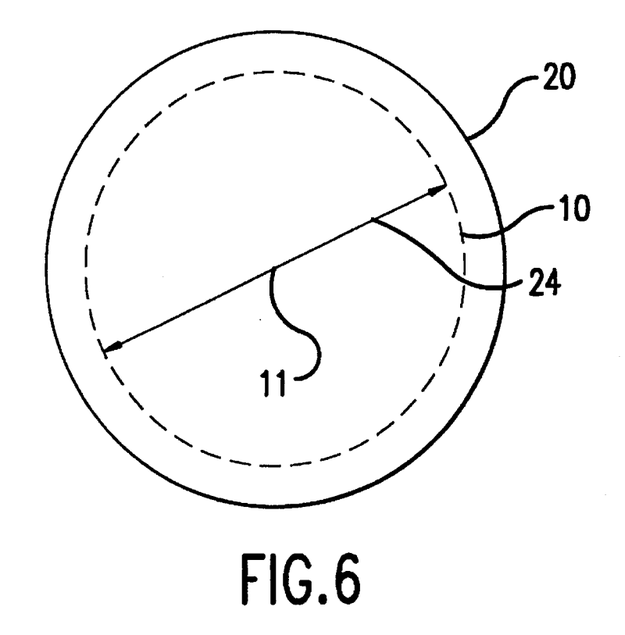
FIG. 6 illustrates a plan view of the optical preform, appropriately marked to align a cylinder or a progressive addition zone with respect to the center of the pupil and the optic axis of the eye.

While the fitting method of the present invention has been described above for a refractive bifocal or multifocal contact lens, the method may also be employed to fabricate any type of diffractive contact lenses 23 such has (but not limited to) Fresnel zone plates, as shown in FIG. 4F, or contact lenses of Fresnel lens design. In accordance with the invention, the relationship of the center of the pupil 11 with respect to the optical preform 20 is determined (in this case by physically marking the preform 20), and then this relationship is used to position the add segment (in this case a set of concentric zone plates or Fresnel lens segments).

The preferred method of determining the relationship between the center of the pupil 10 with respect to the optical preform 20 is to physically mark the center of the pupil 10 while the optical preform 20 is on the patient's eye. Of course, no physical mark need be made. For example, the lens can be observed through a transparent grid as a yardstick to measure the position of the center of the preform 20 with respect to the pupil 10 by observation (e.g., in cartesian or polar coordinates).

In another embodiment of the invention, the optical preform 20, in the hydrated or anhydrous state, is mounted on a frame, for example, with its anterior side up. A premeasured amount of a polymerizable resin 30 is then placed over the top of the preform 20, and the mold 40 is immediately placed over the resin 30, allowing the resin 30 to spread and fill up the intervening space between the mold 40 and the optical preform 20. The mark made on the optical preform 20 is now lined up with the geometric center of the mold 40. The mold 40 is rotated until the axis of the cylinder 24 incorporated in the optical preform (if any) is in correct alignment with the add power zone of the mold 40. If desired a resin mass is added as a weight to stabilize the preform against rotation. The mold assembly 43 is then cured (typically over a period ranging from 2 seconds to 180 minutes, depending on the cure scheme) following a predetermined cure schedule. The temperature of the mold assembly 43 is preferably controlled to within ±1° C. during the cure process. Either heat, light, or a combination of the two may be used to effect the cure process, depending on the polymerization initiator (or initiators) used in the resin formulation.

In another embodiment of the invention, as seen, for example, in FIGS. 5A to 5D, a specified volume of polymerizable resin 30 is placed in the bowl of an optical mold 40 which incorporates the final optical design of the finished lens (for example, a bifocal 41 or a progressive 42 addition lens zone in the mold 40). The optical preform and mold can have substantially the same or substantially different curvatures. For example, the preform 20 and mold 40 have substantially the same base curvatures in FIGS. 5A and 5C, while having substantially different base curvatures in FIGS. 5B and 5D. The optical preform 20 is placed on the resin 30, allowing the resin 30 to spread out and fill the space between the preform 20 and the mold 40. The resulting mold assembly is then cured in a curing chamber as described above.

Figure 8:
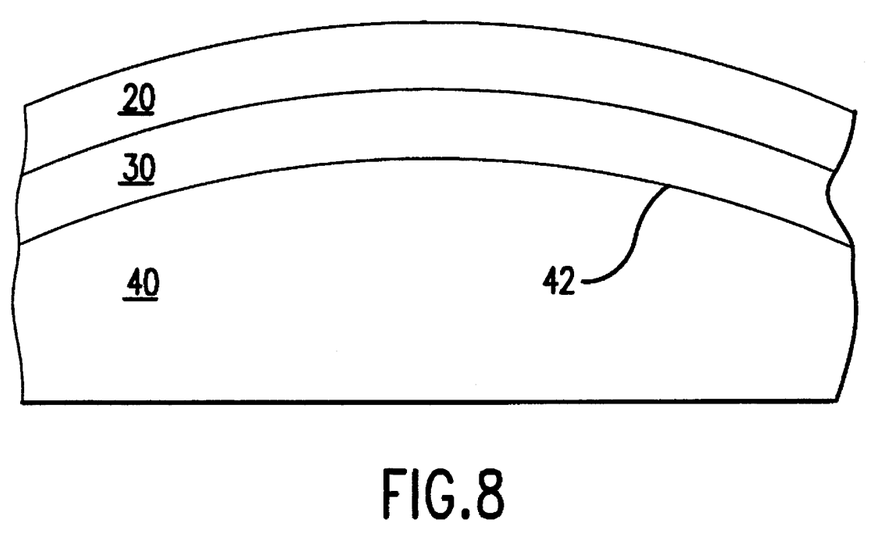
FIG. 8 is a partial cross-section of a mold assembly for the fabrication of a contact lens with a progressive addition lens incorporated on the concave face of the lens.

Similarly, FIG. 8 illustrates a cross-sectional view of a mold assembly wherein a resin 30 is placed between the convex surface of a mold 40 and the concave surface of a lens preform 20. The configuration of the mold 40 is dictated by the final optical design of the lens preform 20—in this case, by the addition of a progressive addition lens zone 42.

Figure 10:
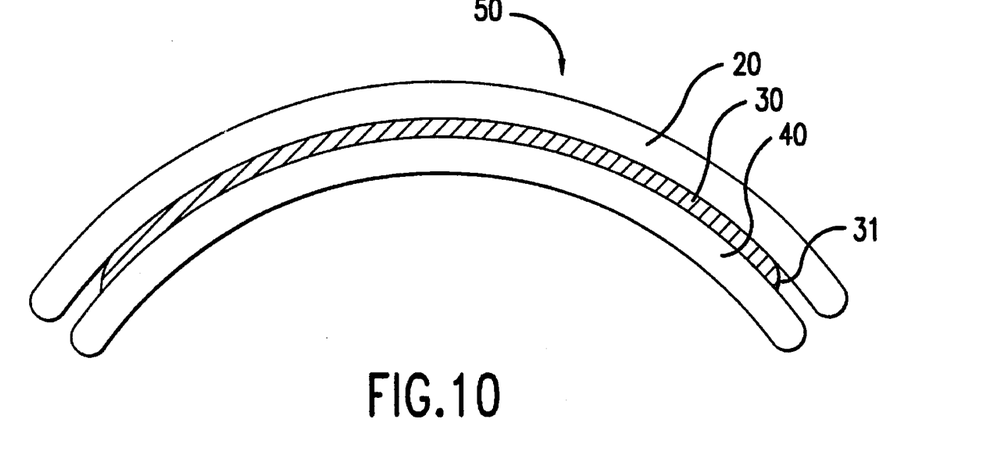
FIG. 10 illustrates a cross-sectional view of a mold assembly for providing a dissipated, or feathered, near the edge of the lens preform, according to an embodiment of the invention. The mold assembly comprises a lens preform, a resin layer on top of the lens preform, and a mold on the resin.

In the above and other embodiments, the resin layer 30 can be extended to the edge of the optical preform (e.g., as a thin, non-prescription carrier layer or as part of a prescription zone, such as toric or spherical zone). In such a case, it may be desirable to machine or polish the lens edge for a comfortable fit. Alternately, the resin layer 30 can be designed to gradually diminish in thickness to the point of disappearance (referred to herein as "dissipating" or "feathering"), before reaching the edge of the lens preform. The feathering can occur in the immediate vicinity of the cast feature of interest, or can occur at the edge of a carrier layer which, in turn, preferably extends to the edge of the lens. Feathering is controlled by many factors, including resin volume, resin viscosity and mold design contour. One preferred method of providing feathering is to rotate or spin the mold assembly (comprising an optical preform, resin and mold) while curing. Referring now to FIG. 10, another preferred method of creating a feathered edge 31 is to cure the mold assembly 50 in a position such that the mold 20 is above the lens preform 40 which is held in position by surface tension of the resin 30. Other means of controlling the position and extent of the feathering will be appreciated by those of skill in the art.

In another embodiment of the invention, the bonding surface of the optical preform (either the concave or convex surface) is surface modified prior to casting the new surface-cast area so that a stronger and more durable bond may be developed between the surface of the optical preform and the added layer. Such a surface modification may, without limitation, consist of a mechanical toughening of the surface, treatment by an energy source such as heat, ultraviolet, X-ray or gamma radiation, treatment leading to a chemical etching of the surface or addition of a thin layer of a new chemical designed to enhance bonding properties.

The resin formulation used in the SurfaceCasting™ process typically consists of a mixture of hydrophilic acrylates, methacrylates and vinyl carbazoles, which on curing produces a cross-linked hydrophilic network that has water uptake similar to the material of the optical preform. In fact, the same resin formulation may be used to produce the SurfaceCast™ as the optical preform. Even if a different formulation is chosen for the SurfaceCast™, the water uptake of the SurfaceCast™ layer should be matched to within 1% of that of the optical preform, in order to avoid differential swelling and the resulting distortion of the optic.

If the formulation used for the SurfaceCast™ is miscible with water, the SurfaceCasting™ operation may be performed on the optical preform while in the hydrated state. If the SurfaceCasting™ process is performed on a hydrated optical preform, the curing process must be completed rapidly, typically in less than two minutes, in order to avoid excessive diffusion of the monomer mixture into the preform. A photochemical curing process is particularly advantageous for this purpose. Alternatively, the preform may be dehydrated before SurfaceCasting™, by drying it in an oven at 95° C. in an environment that includes a stream of dry nitrogen gas or, alternatively, in vacuum for 20 minutes. This procedure does not completely dehydrate the preform, but drives off more than 75% of the water absorbed in the optic. Dehydration of optical preforms which have water uptake greater than 50% is not recommended because dehydration may cause micro cracks to develop in the optic.

If the optical preform consists of a hydrophobic material, or if the formulation used for the SurfaceCast™ is not entirely miscible with water, the SurfaceCasting™ operation should be performed with the optical preform in a dehydrated state. Hydrophobic lenses which do not take up water may be used if a lens with a high refractive index is desired since the refractive index of hydrophilic lenses currently in use rarely exceed 1.42.

The above has been a detailed discussion of certain embodiments of the present invention. They should not be considered so as to limit the scope of applicants' invention which is defined by the appended claims.

What is claimed is:

1. A method for providing a contact lens comprising:

fitting a patient with an optical preform;

identifying a position on the surface of the optical preform corresponding to the center location of the patients's pupil;

arranging the optical preform, a volume of polymerizable resin, and a mold comprising a casting zone, so that the resin occupies at least the intervening space between the mold and the optical preform in the area of the casting zone;

aligning the casting zone on the mold to a predetermined position with respect to the position on the surface of the optical preform corresponding to the center of the patient's pupil; and polymerizing the resin to provide a contact lens with an optical modification corresponding to said casting zone.

2. The method of claim 1, wherein said optical preform is a single vision contact lens and said optical modification is a bifocal, multifocal or progressive add power portion.

3. The method of claim 1, wherein said optical preform is a single vision lens and said optical modification zone is a toric zone.

4. The method of claim 1, wherein said optical preform is a toric or astigmatic lens and said optical modification is a bifocal, multifocal or progressive add power portion.

5. The method of claim 1, wherein said optical preform is single vision lens and said optical modification changes the distance power of the optical preform.

6. The method of claim 1, wherein said resin contacts only the convex side of the optical preform.

7. The method of claim 1, wherein said resin contacts only the concave side of the optical preform.

8. The method of claim 1, wherein said casting zone comprises a weight or stabilization zone to provide a resin mass on the optical preform sufficient to stabilize the optical preform against rotation.

9. The method of claim 1, wherein said casting zone comprises both a weight or stabilization zone and an add power zone.

10. The method of claim 1, wherein the mold is positioned above the optical preform during the polymerizing step such that the resin dissipates at or near the edge of the casting zone.

11. The method of claim 1, wherein the mold, the polymerizable resin and the optical preform are rotated during the polymerizing step such that the resin dissipates at or near the edge of the casting zone.

12. The method of claim 1, wherein the mold is positioned above the optical preform during the polymerizing step such that the resin dissipates at or near the edge of the optical preform.

13. The method of claim 1, wherein the mold, the polymerizable resin and the optical preform are rotated during the polymerizing step such that the resin dissipates at or near the edge of the optical preform.

14. A method of providing a toric contact lens comprising:

selecting a toric optical preform having a specified cylinder;

providing a mold having a weight or stabilization zone to provide a resin mass on said toric optical preform sufficient to stabilize the toric optical preform against rotation;

arranging the optical preform, the mold and a predetermined volume of polymerizable resin such that the axis of the cylinder is fixed at a predetermined rotational position with respect to the mold and such that said resin occupies at least the intervening space between the mold and the optical preform in the area of the weight or stabilization zone; and polymerizing the resin to provide a toric lens that is stabilized against rotation.

15. The method of claim 14, wherein the mold further comprises a bifocal, multifocal or progressive addition zone in addition to said weight or stabilization zone.

16. The method of claim 14, wherein the mold is positioned above the optical preform during the polymerizing step such that the resin dissipates at or near the edge of the casting zone.

17. The method of claim 14, wherein the mold, the polymerizable resin and the optical preform are rotated during the polymerizing step such that the resin dissipates at or near the edge of the casting zone.

18. The method of claim 14, wherein the mold is positioned above the optical preform during the polymerizing step such that the resin dissipates at or near the edge of the optical preform.

19. The method of claim 14, wherein the mold, the polymerizable resin and the optical preform are rotated during the polymerizing step such that the resin dissipates at or near the edge of the optical preform.

20. A method of providing a bifocal, multifocal or progressive contact lens comprising:

selecting an optical preform with a bifocal, multifocal or progressive addition zone;

providing a mold having a weight or stabilization zone to provide a resin mass on said optical preform sufficient stabilize the optical preform against rotation;

arranging the optical preform, the mold and a predetermined volume of polymerizable resin such that the bifocal, multifocal or progressive addition zone is fixed at a predetermined rotational position with respect to the mold and such that said resin occupies at least the intervening space between the mold and the optical preform in the area of the weight or stabilization zone; and polymerizing the resin to provide a bifocal, multifocal or progressive lens that is stabilized against rotation.

21. The method of claim 20, wherein the mold is positioned above the optical preform during the polymerizing step such that the resin dissipates at or near the edge of the casting zone.

22. The method of claim 20, wherein the mold, the polymerizable resin and the optical preform are rotated during the polymerizing step such that the resin dissipates at or near the edge of the casting zone.

23. The method of claim 20, wherein the mold is positioned above the optical preform during the polymerizing step such that the resin dissipates at or near the edge of the optical preform.

24. The method of claim 20, wherein the mold, the polymerizable resin and the optical preform are rotated during the polymerizing step such that the resin dissipates at or near the edge of the optical preform.

* * * * *

UNITED STATES PATENT AND TRADEMARK OFFICE
CERTIFICATE OF CORRECTION

PATENT NO. : 5,517,259
DATED : May 14, 1996
INVENTOR(S) : Ronald D. Blum, et. al.

It is certified that error appears in the above-indentified patent and that said Letters Patent is hereby corrected as shown below:

| Column | Line | |
|---|---|---|
| 2 | 3 | Change "vise" to --vice--. |
| 2 | 46 | Change "(21 lens)" to --(21 lenses)--. |
| 4 | 19 | After "feathered" insert --resin layer--. |
| 5 | 20 | Change "cross-linkers" to --cross-linker--. |
| 7 | 9 | Change "such has" to --such as--. |
| 8 | 29 | Change "toughening" to --roughening--. |
| 10 | 37 | After "sufficient" insert --to--. |

Signed and Sealed this

Twenty-first Day of October 1997

Attest:

BRUCE LEHMAN

*Attesting Officer*  *Commissioner of Patents and Trademarks*